United States Patent Office 2,816,479
Patented Dec. 17, 1957

2,816,479
PARTICLE MEASUREMENT

Clifford K. Sloan, Thornton, Pa., assignor to E. I. du Pont de Nemours and Company, Wilmington, Del., a corporation of Delaware Application July 6, 1954, Serial No. 441,413

6 Claims. (Cl. 88—14)

This invention relates to characterization of discrete inhomogeneities of a heterogeneous system, particularly determination of particles in a particulate system by measurement of scattering of light thereby at small angles.

Many disperse systems contain discrete inhomogeneities having one or more dimensions on the order of microns, and it often is desirable to characterize their size, location, or number, the latter especially where those falling within a selected dimensional range constitute in number a small but important fraction of the whole system. Herein the general term "particle" is used to denote such inhomogeneities, which may be any of a variety of phase combinations and in any form, of which common examples are grains, drops, bubbles, gel particles, and filaments. "Particulate" is the general designation herein for systems subject to the described characterizing procedure.

Although the light microscope is useful in the micron range, its utility for this purpose is limited by difficulty in resolving individual particles, frequently because of their motion or because of lack of sufficient discontinuity in refractive index at their boundaries; in any event, the microscopic method is recognizedly tedious. Devices responsive to gross changes in light intensity may be useful in counting particles in a predetermined size range but are incapable of providing detailed size information, while apparatus capable of doing the latter, as by scanning the light-scattering pattern from a particle of relatively constant location and dimensions, may be of little use upon less well-behaved particles; furthermore, these and other arrangements are relatively insensitive over appreciable ranges of particle size, which may include that toward which the present invention is directed.

A principal object of the present invention is to provide a method for characterizing a moving disperse system by a count and size determination of occasional particles therein whose presence in a beam of light through which the system passes varies the light-scattering pattern of the system. Another object is to provide means for simultaneous measurement of light scattered at a plurality of small angles in the range of intensity ratios from about 2:1 to about 10:1 by a single particle as the disperse system containing the particle moves through the beam of light being scattered thereby.

Figure 1:
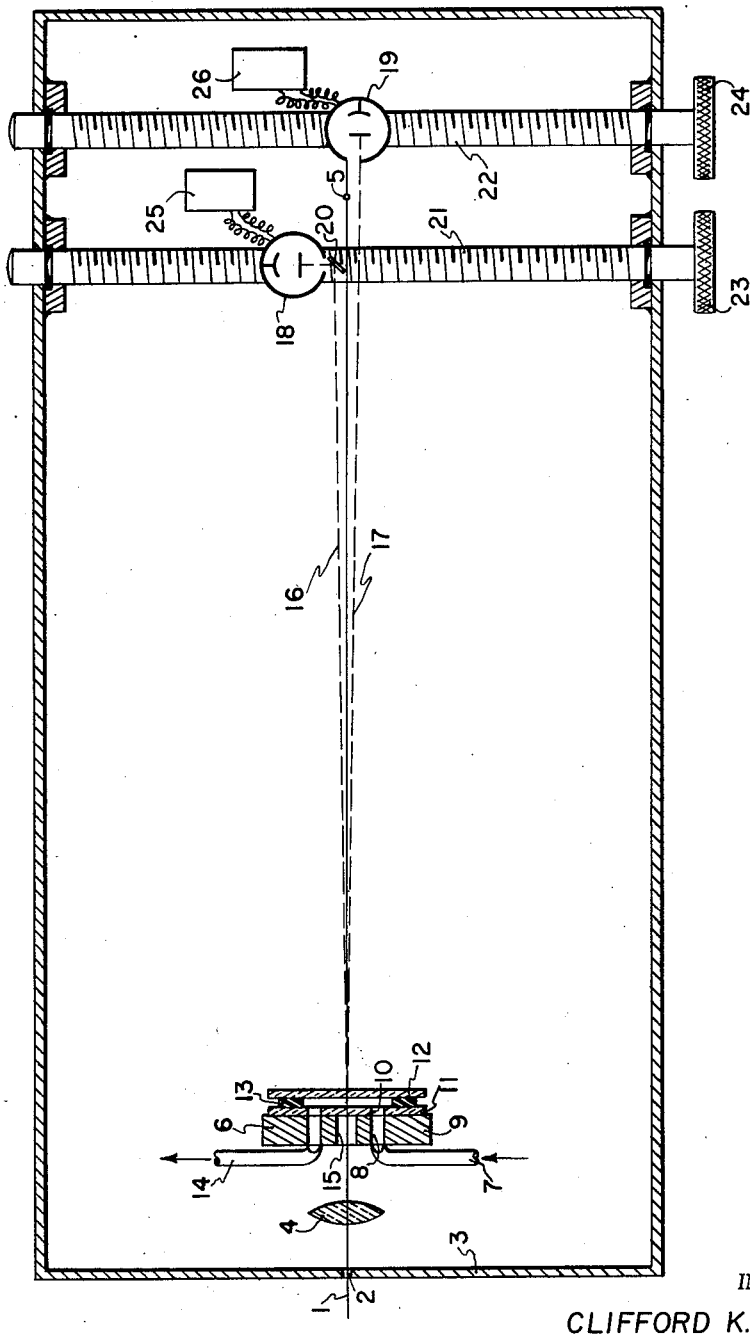
Figure 2:
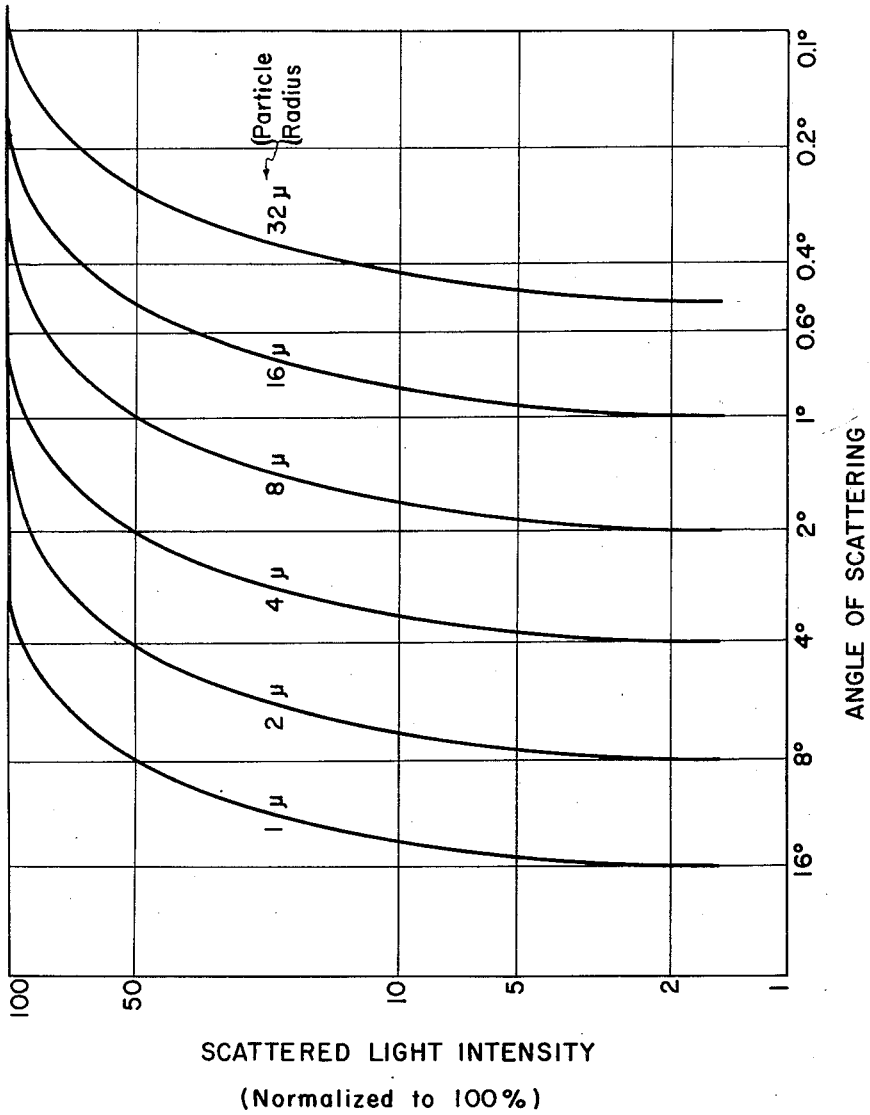

Methods and means for accomplishing the above and other objects of this invention will be apparent from the following description and the accompanying diagrams, in which Figure 1 is a partly schematized plan view of an apparatus embodiment of the invention and Figure 2 is a graph of light intensity versus scattering angle for particles of various indicated sizes.

In general, the objects of this invention are accomplished by directing a beam of light through a particulate system moving so as to illuminate in succession particles which scatter light from the beam in a characteristic pattern and determining simultaneously the relative amounts of light scattered thereby at selected angles. The invention comprehends an arrangement whereby a light-scattering particle passes across a beam of light being converged by a lens to a point near which are located two or more light-sensitive elements; this point and the source of the light beam are at conjugate foci of the lens, and the light-sensitive elements are located outside the principal light beam at different small angles thereto measured with apex at the location of the light-scattering particle.

The arrangement illustrated in Figure 1 is especially adapted to use with a fluid system. Flow cell 6 is designed to transport a fluid system (which may be a dispersion of discrete particles in fluid medium, for example) across light beam 1, which emanates from slit 2 in light-tight housing 3. The fluid system enters the cell through tube 7 and passes through hole 8 in supporting stainless steel block 9, then through contiguous hole 10 in glass plate 11. The fluid passes through the light beam while confined between glass plate 11 and second glass plate 12 separated therefrom by spacer ring 13; it then leaves the cell by exit tube 14, which is similar to the entry tube. Hole 15 in the center of the supporting block permits directing of the light beam through the cell; the principal light beam and the cone of diffracted light surrounding it are small here compared to this center hole.

Scattered light rays 16 and 17 originating at the illuminated particles in the fluid system diverge from the principal light beam. The intensity of the scattered rays at two selected small angles is measured by phototubes 18 and 19 located close to and on opposite sides of point 5. This point and the slit source are located at conjugate foci of lens 4. The appreciable size of the phototubes makes close spacing of them impractical at small angles, so phototube 18 is located with its entrance slit at an angle of 90° to the principal light beam, and mirror 20 reflects scattered ray 16 into this phototube at a right angle to the principal light beam. Phototube 19 is disposed so that scattered ray 17 enters its entrance slit directly. The phototubes are mounted on threaded travelers riding on screws 21 and 22 socketed at the housing wall to permit movement of the tubes perpendicular to the principal light beam. The pitches of the two screws are selected to compensate for the small difference in their distances from the light-scattering sample so that equal turning of knobs 23 and 24 moves the respective phototube the same angular distance with respect to the principal light beam. This tangential mounting is satisfactory at the small angles for which the equipment is used most advantageously; the distance of the phototubes from the sample is very large with respect to the wave-length of light used, being perhaps a million times that wave-length. Further details of a like optical system utilizing only one phototube appear in Baum application Serial No. 247,927, filed September 24, 1951, now Patent No. 2,788,702, issued April 16, 1952.

In the drawing the two phototubes appear on opposite sides of the principal light beam, which is necessary when the tubes are at very small angles to the light beam, but when permitted by the size of angle between them it usually is preferable to have the phototubes on the same side of the principal light beam in order to eliminate possible difference in light intensity caused by unsymmetrical scattering. The phototubes, which conveniently are of the electron-multiplier type (1P21 or 5819, for example), are connected to recorders 25 and 26. The recorders comprise electronic amplifiers and means for indicating the response in permanent form.

The described apparatus is useful in characterizing particles with the aid of known relationship between the size of individual particles and the intensity of light scattered simultaneously at different angles. Data obtained in this way are substantially independent of such factors as refractive index and type of illuminant or recorder. Determination of particle size is based upon the characteristic decrease in intensity with increase in angle of the light scattered by small particles, as calculated in accordance with Mie theory and light diffraction equations. This is shown clearly on curves of the logarithm of intensity of scattered light plotted against the logarithm of the angle of scattering, as in Figure 2. Each member of this family of curves exhibits the same characteristic drop in intensity with increase in angle, which occurs at larger angles for smaller particles; accordingly, the size of an individual particle passing through the light beam of this apparatus can be determined by measuring scattering produced at two selected angles.

The curve (Figure 2) for a particle 32 microns in radius shows that the particle scatters only about 13% as much light at 0.4° as it does at 0.1°. Furthermore, a 16-micron particle (radius) scatters 67% as much light, and an 8-micron particle 96% as much light at 0.4° as the same particles do at 0.1°. Particles smaller than about 8 microns in radius scatter as much light at 0.4° as they do at 0.1°. The following table is prepared from the curves of Figure 2, showing the ratios between the scattering intensities at 0.1° and 0.4° for particles from 8 microns radius to 32 microns radius.

Table I

| Radius of Particle (Microns) | $I_{0.1°}/I_{0.4°}$ |
| --- | --- |
| 32 | 96/13 = 7.4 |
| 16 | 100/67 = 1.5 |
| 8 | 100/95 = 1.05 |

Experimental determination of this ratio ($I_{0.1°}/I_{0.4°}$) in intensity of light scattered by a particle permits the determination of its size within the range from about 8 microns to about 50 microns in radius. Similarly, the size of smaller particles can be obtained by comparison of the intensity values obtained simultaneously at two larger angles. Ratios at 1° and 2° for particles of radius from 2 to 8 microns are listed in Table II.

Table II

| Radius of Particle (Microns) | $I_{1°}/I_{2°}$ |
| --- | --- |
| 8 | 50/2 = 25 |
| 4 | 91/52 = 1.8 |
| 2 | 100/90 = 1.1 |

Intensity ratios of an intermediate value (between 2 and 10) are most accurate for particle-size determination by this method. As the ratio becomes larger, the actual size becomes indeterminate, although it is established to be above a definite value. Similarly, as the ratio becomes smaller, the measurement means that the particle must be smaller than a definite size. Appropriate pairs of angles can be selected for maximum sensitivity for given size ranges. Ideally, the phototubes are placed so as to receive scattered light rays in an intensity ratio of about 4, as this represents the most sensitive angular positioning for fixing the size of the subject particles. In the angular range here considered, where "small" designates an angle within about 10° of the principal light beam, the angular separation of the phototubes for optimum sensitivity will not exceed about 5°.

With the flow cell described here at a distance of about 50 centimeters from the phototubes, a flow rate of about 12 cubic centimeters of the dispersion per minute has proved satisfactory, with one-tenth of the flowing sample actually passing through the light beam. Of course, the flow rates are adjustable, as by varying the fluid pressure or the volume of the cell itself. This cell is quite satisfactory for transporting a fluid dispersion across the light beam, but other arrangements may be used to good purpose. Aerosols that might deposit particles on the glass and metal surfaces of the flow cell can be forced across the light beam from a nozzle and then removed by a suction blower. Flocculation and sedimentation can be followed in suitable gaseous or liquid samples. In any case, it is helpful to confine the sample to a short distance along the light beam. When solid dispersions (such as transparent plastic films, bars, or filaments) are being tested, the flow cell is replaced by suitable means for moving the particular object across the light beam.

Preparation of the equipment for operation is simple. With the disperse system adjusted to proper rate of flow, a parallel beam of monochromatic light, as from the 5461 A. line of a mercury arc, is passed through the moving dispersion. With the near (i. e., nearer the sample) phototube out of position, the far phototube is moved to the position of the principal unscattered beam, which is at 0°. Then the near phototube is moved until it is centered in the principal light beam. The apparent peak intensities recorded by the two phototubes at 0° are balanced by adjusting the potentials supplied to the tubes. It is desirable that the tubes chosen be substantially identical in sensitivity and slit dimensions.

A further check on the balance of the two phototubes is then made by moving the near tube a certain distance (say 0.4°) to the left of the principal beam and the far tube the same distance to the right of the principal beam. With the two tubes in these similar positions, their noise-levels are balanced. The recorders are set similarly for identical response, after which the two tubes may be moved to various positions as desired. The angles selected should provide an intermediate ratio of light intensities for characterization of particles in the particular size range under investigation. The size of the observed particles may be calculated from data in Tables I and II or from similar tables prepared for other angle pairs. The number of particles is recordable as a function of the quantity of a fluid system passing through the light beam; alternatively, the record can show the location of particles in a solid medium. Computation of location or number and of size may be accomplished by comparators of conventional design operated in conjunction with the photosensitive elements or the mentioned recorders, as is readily apparent. The incremental response caused by the presence of occasional particles of the detectable dimensions may be separated readily from a substantially constant background level.

The invention has several advantages over the hitherto known types of apparatus for determining inhomogeneities in particulate systems, especially where the particles have a radius from about 2 microns to about 50 microns and where they are present in the system so occasionally that previously known methods would require an excessive number of observations at different points in order to detect the individual particles. As the present determination is based on the ratio of the intensity of light scattered simultaneously at two (or more) different angles, the size data obtained are independent of such factors as the refractive index of the particle and the dispersing medium. The size data also are independent of the type of illuminant employed and the type of recorder used in measuring the intensity of the light scattered. Another advantage is freedom of this method from influence or interference by particles whose size is substantially outside the range mentioned. Furthermore, the method of this invention is easily carried out and is not so tedious as the determination of particle size by means of a light microscope.

The invention is useful in investigating or controlling the processing of polymeric materials, including clarification, filtration, and extrusion of melts, gels, or solutions of polymers. For example, it is useful in determining the size of inhomogeneities in solutions or gels of such polymers as cellulose xanthate, polyvinyl alcohol, polyacrylonitrile and carboxymethylcellulose. The apparatus can be used for counting blood corpuscles. It also can be used for determining the number and size of particles or inhomogeneities in transparent films, sheets, or fibers made of polymers, glass, or other materials. Gel particles and pigment aggregates can be determined readily, even in the presence of dispersed pigment concentrations used in delustering, as the pigment particles are too small to interfere. Other advantages of practicing the present invention will come readily to mind.

I claim:

1. In a method for making a count and size determination of light-scattering particles for a selected dimensional range of particle sizes in a particulate disperse system, the steps which comprises directing a beam of light through a dispersion containing the light-scattering particles, moving the dispersion relative to the beam to illuminate in succession each particle to be determined, and simultaneously detecting the relative intensities of light scattered at two selected angles to the unscattered beam as each particle is illuminated, the larger of said angles being selected to provide a low but detectable intensity of scattered light for the largest particle size to be determined, and the smaller of said angles being selected to provide a small but detectable difference between the scattered light intensities at the two angles for the smallest particle size to be determined and a negligible difference for still smaller particle sizes.

2. A process as defined in claim 1 wherein the dispersion is a fluid and is flowed through the beam at a controlled rate as a relatively thin layer at right-angles to the beam.

3. A process as defined in claim 1 wherein the two angles at which scattered light intensity is detected are selected to provide an intensity ratio between 2 and 10 for particle sizes to be determined, the ratio being determined as the intensity at the smaller angle divided by the intensity detected at the larger angle.

4. A process as defined in claim 1 wherein the two angles at which scattered light intensity is detected are each within an angle of ten degrees relative to the unscattered beam and the two angles are within an angle of five degrees from one another.

5. An apparatus for making count and size determinations of light-scattering particles for a selected dimensional range of particle sizes dispersed in a fluid medium, which comprises a fluid cell for the dispersion having two closely-spaced parallel transparent walls, means for flowing a dispersion through the cell, light-directing means for passing a single slit-shaped beam of parallel light through the cell and dispersion contained therein, and two photosensitive detectors for measuring the relative intensities at selected angles of light scattered by a particle in the dispersion and transmitted from said cell including light-control means in combination with each of said detectors for admitting only light scattered over a small angle, each of said light-control means being adjustable to select for measurement light scattered at a particular angle in the range of 0.1 to 10 degrees relative to the unscattered beam, where the apex of said angle is within the fluid cell.

6. An apparatus as defined in claim 5 wherein said detectors include means for simultaneously recording the intensities of scattered light measured at the two selected angles.

References Cited in the file of this patent

UNITED STATES PATENTS

| | | |
|---|---|---|
| 2,420,077 | Hasler et al. | May 6, 1947 |
| 2,562,181 | Frommer | July 31, 1951 |

FOREIGN PATENTS

| | | |
|---|---|---|
| 396,390 | Great Britain | Aug. 1, 1933 |
| 479,662 | Great Britain | Feb. 9, 1938 |
| 908,380 | France | Sept. 10, 1945 |
| 278,998 | Switzerland | Mar. 1, 1952 |
| 668,433 | Great Britain | Mar. 19, 1952 |